United States Patent [19]
Van Arsdale et al.

[11] 3,722,530
[45] *Mar. 27, 1973

[54] PIPELINE BY-PASS FLOW CONTROL SYSTEM

[75] Inventors: Lyle R. Van Arsdale; Francis M. Lathrop, III, both of Houston, Tex.

[73] Assignee: M & J Valve Company, Houston, Tex.

[ * ] Notice: The portion of the term of this patent subsequent to Nov. 16, 1988, has been disclaimed.

[22] Filed: Feb. 1, 1971

[21] Appl. No.: 111,351

Related U.S. Application Data

[63] Continuation-in-part of Ser. No. 719,338, April 8, 1968, abandoned, and a continuation-in-part of Ser. No. 796,619, Feb. 14, 1969, abandoned.

[52] U.S. Cl. .............................. 137/268, 15/104.06
[51] Int. Cl. ............................................... B08b 9/04
[58] Field of Search ........ 137/1, 268; 15/104.06, 3.5; 285/156; 134/8

[56] References Cited

UNITED STATES PATENTS

| | | | |
|---|---|---|---|
| 3,620,236 | 11/1971 | Van Arsdale et al. | 137/268 X |
| 3,212,116 | 10/1965 | Gentry, Jr. | 137/268 X |
| 3,428,489 | 2/1969 | Gentry, Jr. | 137/268 X |
| 3,511,272 | 5/1970 | Lathrop | 137/544 |
| 3,524,466 | 8/1970 | Van Scoy | 15/104.06 X |

FOREIGN PATENTS OR APPLICATIONS

| | | | |
|---|---|---|---|
| 40,182 | 7/1887 | Germany | 285/156 |
| 964,683 | 7/1964 | Great Britain | 285/156 |

*Primary Examiner*—Henry T. Klinksiek
*Assistant Examiner*—Robert J. Miller
*Attorney*—Flehr, Hohbach, Test, Albritton & Herbert

[57] ABSTRACT

A system and method for ensuring continual movement of clean-out devices or product separating spheres past the pumping stations of pipelines. Valve controlled branch lines connect through flow-tees with the by-pass portion of the line. The valves of the branch lines are controlled by means including sphere detectors to provide an operating cycle for opening and closing the valves in such a fashion as to cause continual movement of clean-out devices or spheres through the by-pass line section.

1 Claim, 5 Drawing Figures

3,722,530

PIPELINE BY-PASS FLOW CONTROL SYSTEM

CROSS-REFERENCE TO RELATED APPLICATIONS

This application is a continuation-in-part of our copending applications Ser. No. 719,338, filed Apr. 8, 1968 for "Pipeline By-Pass Control System and Method" (now abandoned), and our copending application Ser. No. 796,619 filed Feb. 14, 1969 for "Pipeline By-Pass Flow Control System and Method" (now abandoned).

BACKGROUND OF THE INVENTION

Pipeline systems for the handling of various petroleum products commonly employ so-called booster or pumping stations for increasing the effective fluid pressure head. In a typical instance a flow-tee inserted in the main line is connected by a branch line to the suction side of the station pump. The discharge side of the station pump connects through another branch line with a flow-tee located downstream from the first tee. A check valve is interposed between the two flow-tees to prevent back-flow. When product separating spheres or clean-out devices are passed through the main line, it is customary to provide retrieval means near the upstream end of the by-passed portion of the line whereby these devices are removed. On the downstream side of the station pump suitable means can be provided for launching the clean-out devices or spheres back into the line. Systems of this kind have a number of disadvantages. Particularly, the sphere retrieval and launching devices are relatively complicated, and manual operations are required to transfer the spheres from one device to the other. Also there may be some interruption to the flow occasioned by the manner in which the spheres are retrieved and launched into the line.

SUMMARY OF THE INVENTION

This invention relates generally to systems and methods for use in connection with pipeline pumping or booster stations, and particularly to a flow control system and method which will handle clean-out devices, spheres, or like devices such as are commonly passed through pipelines.

In general it is an object of the invention to provide a system and method of the above character which will avoid the use of sphere retrieval and launching devices at pumping stations and which will make possible the continual movement of spheres and like devices through the by-pass portion of the main line.

Another object of the invention is to provide a system and method of the above character making use of a plurality of flow-tees which connect the by-pass portion of the main line with branch lines and which controls flow through the branch lines in such a fashion as to ensure continual movement of clean-out devices or spheres past the station.

Another object is to provide a system and method which has an automatic cycle of operation.

Additional objects and features of the invention will appear from the following description in which the preferred embodiments have been set forth in conjunction with the accompanying drawing.

The present invention consists of a system or apparatus and a method for use at pumping stations to ensure continual movement of clean-out devices or spheres past the station. A plurality of flow-tees connect with the line at the station, and these tees are connected to a plurality of valve controlled branch lines. The branch lines make connection with the suction and discharge sides of the station pump. A plurality of sphere detecting devices are employed and serve as a part of the control means for the valves of the branch lines. The valves of the branch lines are power operated, and their opening and closing is controlled to provide a predetermined programming in which valves are opened and closed in such a manner as to produce flow conditions which ensure continual movement of the clean-out device or sphere without interferring with operation of the station pump (i.e., without stopping the pump).

DESCRIPTION OF THE PREFERRED EMBODIMENTS

Figure 1:
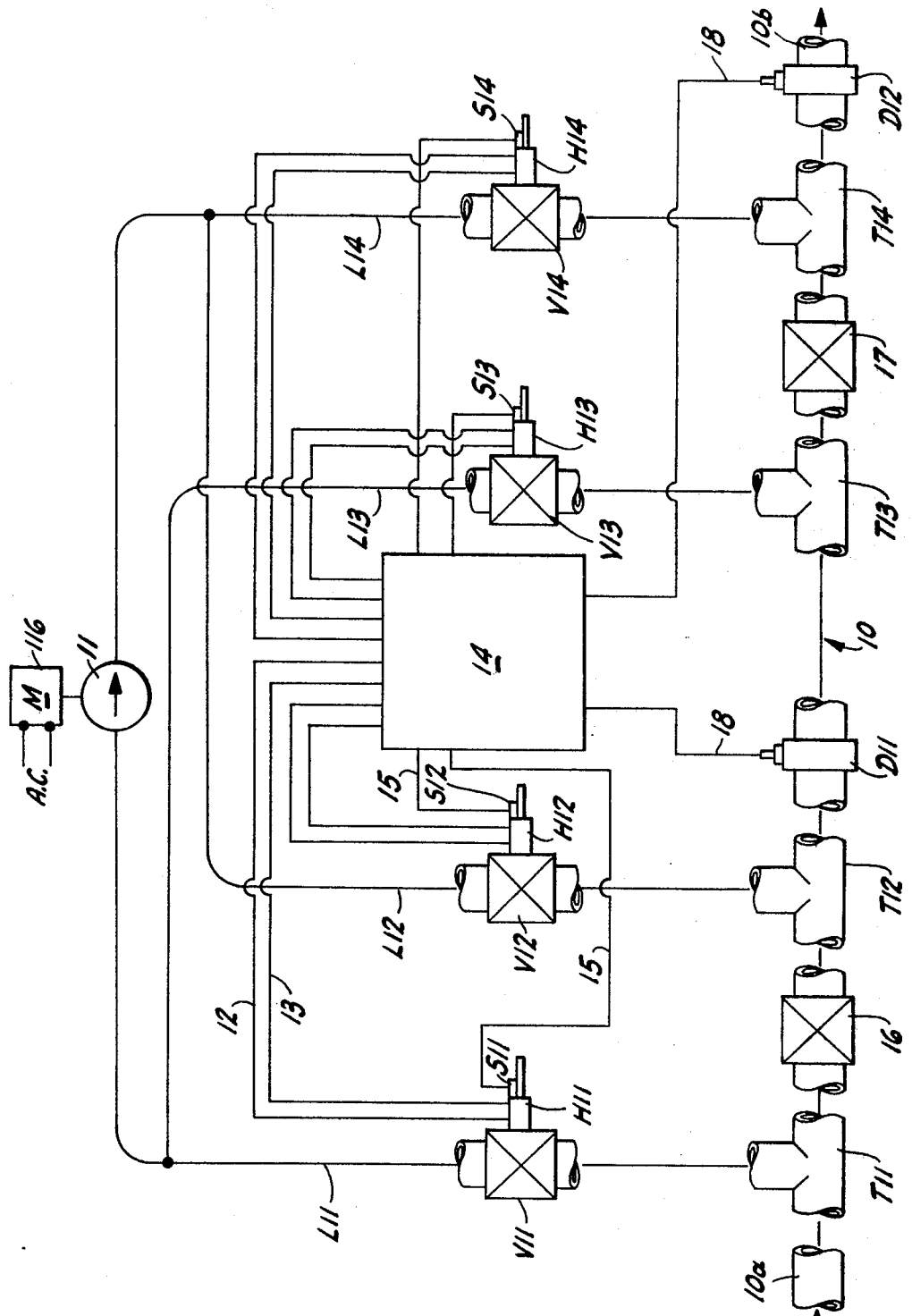
FIG. 1 is a schematic plan view illustrating equipment forming the present system.

FIG. 1 schematically represents a system of equipment for a booster pumping station used in conjunction with a pipeline for the transmission of various products (e.g., petroleum). The portion of main line or section at the station is indicated at 10 and in practice may range in length from about 6 to 100 feet. The main station pump is indicated at 11 and has its suction and discharge sides connected by branch lines L11 and L14 with the flow-tees T11 and T14. These flow-tees constitute the ends of the line section 10 which connects between the upstream and downstream line portions 10a and 10b of the main pipe line. Likewise in the embodiment illustrated two additional branch lines L12 and L13 connect respectively with the intermediate flow-tees T12 and T13. Branch line L12 connects with the discharge side of pump 11, and line L13 connects with the suction side.

Each of the valves V11, V12, V13 and V14 preferably are power operated and capable of remote control. We have found it satisfactory to use valves of the gate type provided with hydraulic operators H11–H14 of the cylinder-piston type. Each of the hydraulic operators are provided respectively with electrical switch devices S11, S12, S13 and S14 which are provided with switch contacts that are operated when the valve is in its extreme limiting (i.e., open or closed) positions. In other words, one switch has its contacts closed when the associated valve is moved to full open position, and the contacts of the other switch are closed when the valve is moved to full closed position. Electrical cables 15 are indicated for circuit wires connecting the switch contacts with the control means or panel 14. In addition to the flow-tees, we provide a plurality of devices for detecting the arrival of a sphere or like object at particular points along the length of the line. Thus a sphere detecting device D11 is located between the flow-tees T12 and T13. A second detecting device D12 is located on the downstream side of flow-tee T14.

The line portion 10 is also provided with means to prevent back-flow of fluid. Thus a check valve 16 is shown interposed between the flow-tees T11 and T12, and a second check valve 17 between the flow-tees T13 and T14. These check valves should be such as will pass the clean-out devices while preventing back-flow of fluid.

The sphere detecting devices D11 and D12 may be of the electrical type utilizing contacts or photoelectric cells and serving to activate a circuit upon the arrival of a sphere. Cables 18 represent circuit connections from the detecting devices D11 and D12 to the control panel 14.

The control panel equipment may vary in its specific nature, but should be such as to make possible an automatic cycle of operation in which the various valves are operated between opened and closed positions in accordance with a predetermined operating cycle to be presently explained in detail. Preferably the controller is such that manual operation may be superposed upon automatic, thus permitting the method to be initiated manually.

Figure 4:
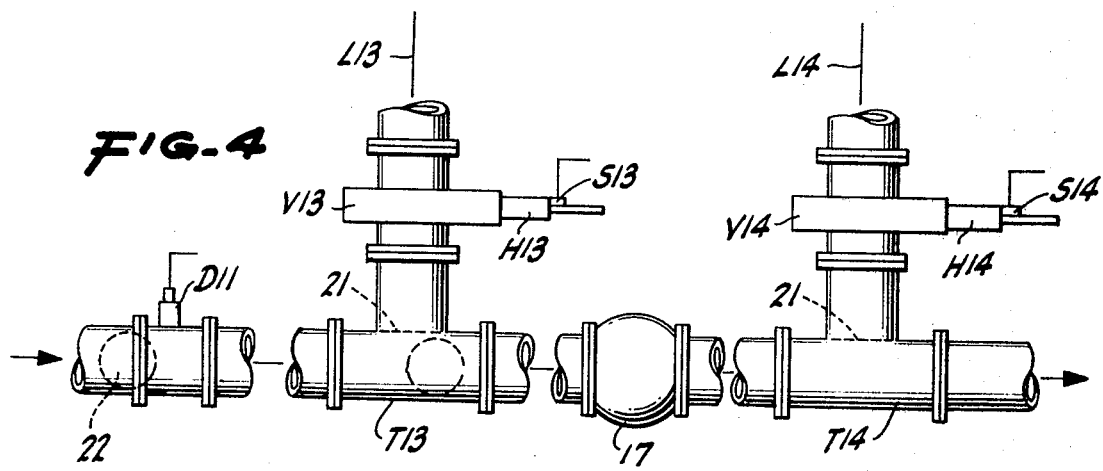
FIG. 4 illustrates two of the flow-tees, one of the sphere detectors and one of the check valves, as connected in the line.

FIG. 4 illustrates only the flow-tees T13 and T14 together with detector D11, and the two valves V13 and V14. Each of the flow-tees is provided with a carrier 21 whereby a sphere or clean-out device passing through the line is not drawn by flow into the associated branch line. A sphere 22 is shown approaching the detector D11.

Figure 5:
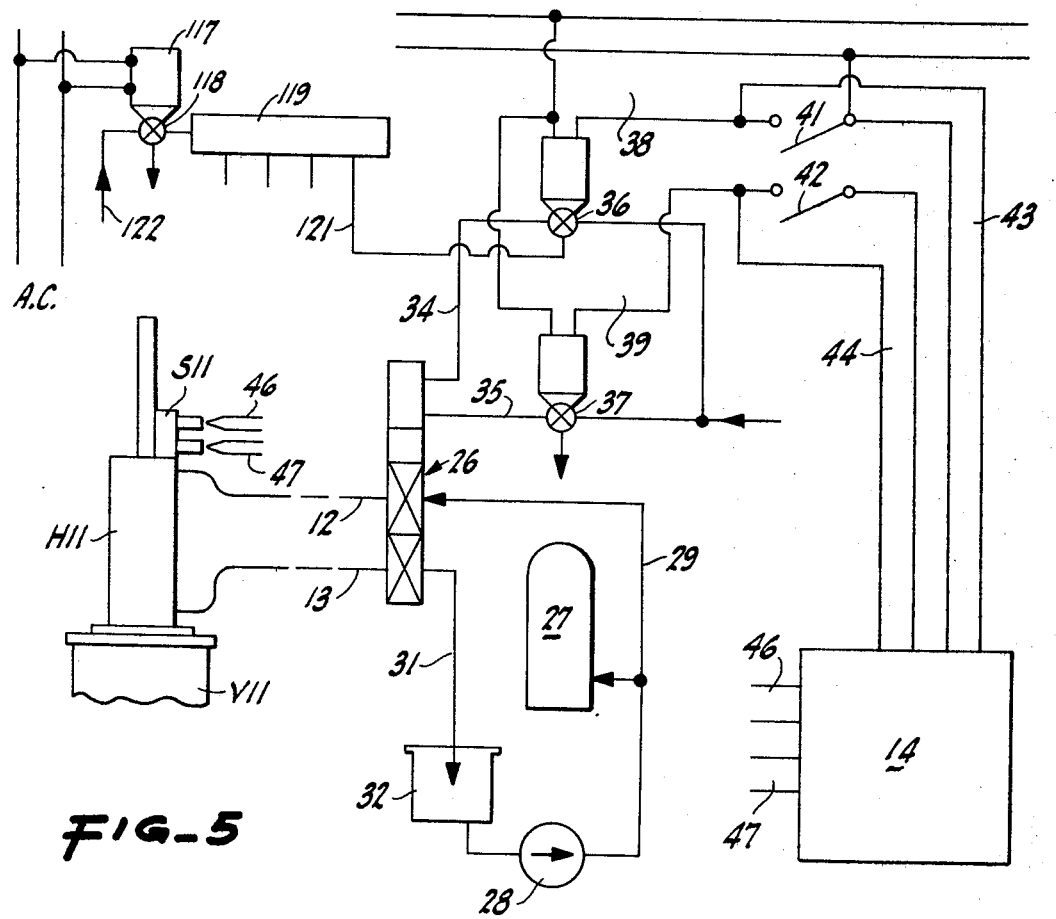
FIG. 5 is a schematic diagram illustrating a hydraulic control means for a power valve operator.

FIG. 5 illustrates parts that may be incorporated in the control panel 14 for effecting controlled hydraulic operation of one of the valves V1. In this instance a small four-way control valve 26 connects with the two lines 12 and 13 leading to the hydraulic operator H11 of the valve V11. As representative of a hydraulic pressure system there is shown a pressure accumulator 27 connected to the discharge side of the pressure pump 28 and a pressure connection by line 29 to the four-way valve 26. The liquid exhausted from the four-way valve 26 is shown passing by line 31 to the reservoir 32, which connects with the suction side of pump 28. Normally the pump is controlled by a pressure switch whereby it maintains a quantity of hydraulic liquid in the accumulator 27 at a desired pressure level. When the pressure drops, pump 28 automatically starts in operation to restore the pressure. A pneumatic cylinder 33 is provided with a piston connected to the operating member of the four-way valve 26. Air is supplied or exhausted from the ends of the cylinder 33 through the lines 34 and 35, which are controlled by the electrical solenoid-operated valves 36 and 37. The two circuits 38 and 39 for the solenoid valves 36 and 37 can be controlled by the closing and opening of the manually operated switches 41 and 42. Thus assuming that the valve V11 is open, operation of the switch 41 serves to supply air under pressure to the pneumatic operator 32 which in turn sets the four-way valve 26 to supply liquid to the line 12 while exhausting liquid from line 13. When the switch 41 is opened the solenoid valve 36 is conditioned to vent air in that part of line 34 between the solenoid valve and the cylinder 33. Similarly the operation of switch 42 serves to open the valve V11.

Control circuits 43 and 44 are shown shunting the switches 41 and 42 and making connection with the control means 14. Similarly it is indicated that other circuits (e.g., 46 and 47) may connect the control means 14 with the operating means of other valves.

The system and method described above preferably employs a flow-tee which by force of gravity induces movement of a sphere through the body of the tee and into a position adjacent its outlet. A novel flow-tee for this purpose is illustrated in U.S. Pat. No. 3,511,272.

The flow-tee of U.S. Pat. No. 3,511,272 is particularly adapted for use with our system. It facilitates the establishment of flow through the branch lines without being obstructed by a sphere, and it ensures application of differential pressure to a sphere when flow through the side line is reduced and flow re-established through the main outlet. Another advantage of this flow-tee is that it enables the inlet and outlet conduits to be on a common horizontal axis, although a gravity ramp is utilized for positioning the sphere within the tee.

It is desirable to provide means which will disable the entire system in the event of power failure to the main pump 11, or application of a signal from a supervisory control system. As shown in FIG. 1, it is customary to drive the pump by an alternating current electrical motor 116. The alternating current supply lines are illustrated in FIG. 5. A solenoid 117 has its winding connected across the alternating current supply lines and serves to open a valve 118 when the voltage across the supply lines falls below a predetermined value. A source of compressed air connects this valve to a manifold 119. The manifold is connected by lines 121 to the pneumatic control valves for actuating the various four-way valves 26. Thus as shown in FIG. 5, the vent port of the solenoid operated valve 36 is connected to the line 121 whereby vented air may pass through the manifold 119 and through the solenoid operated valve 118 as indicated. If a power failure occurs, valve 118 is operated to connect manifold 119 with the power supply line 122 whereby air under pressure is applied through all of the solenoid operated valves 36 to actuate all of the four-way valves 26 to effect hydraulic closing of any of the valves V11 – V14 which at that time may have been open, thus disabling the entire system. Also solenoid 117 can connect with a supervisory control system, whereby in the event the supervisory system requires a shut-down, solenoid 117 is deenergized.

Figure 2:
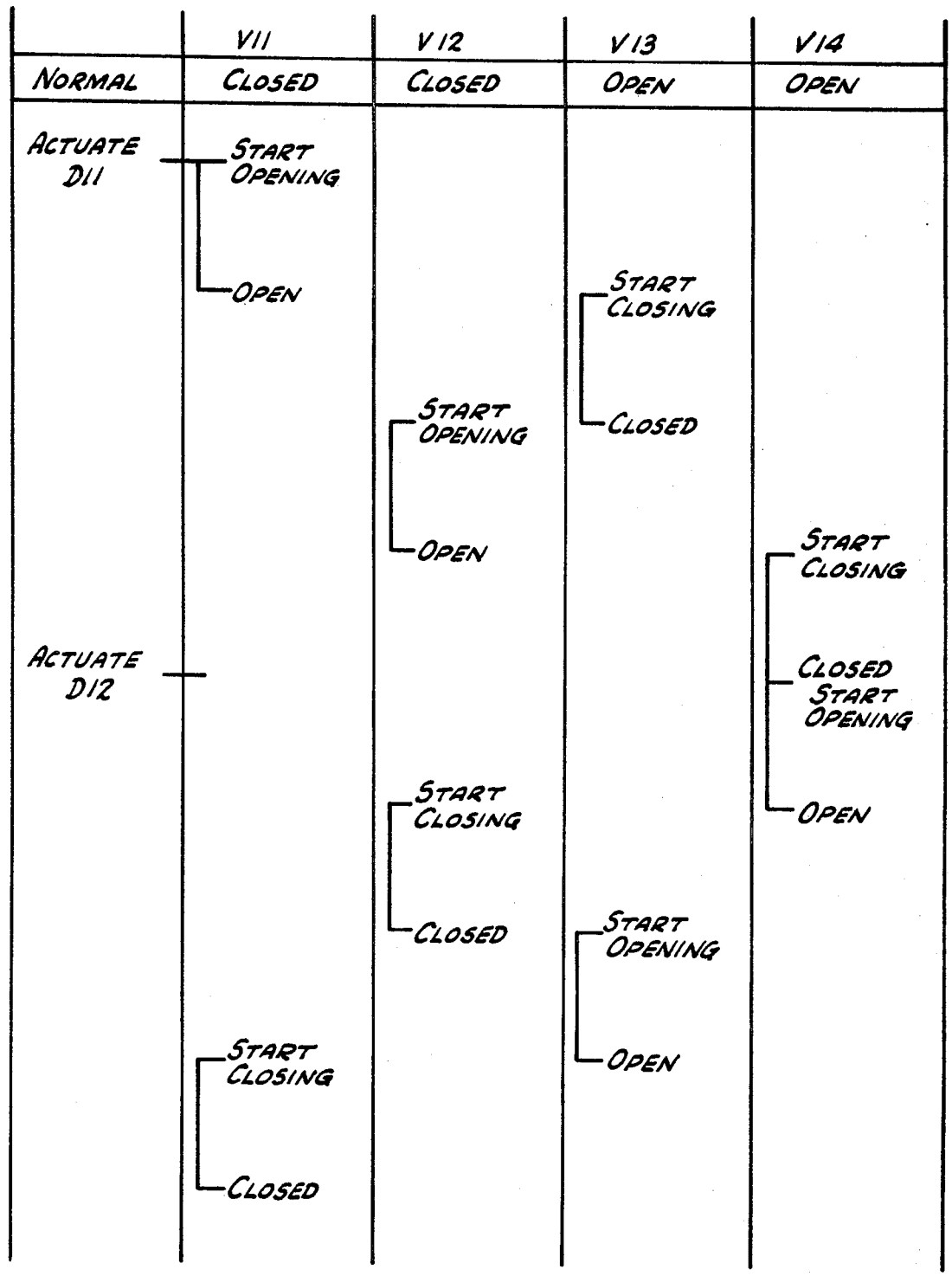
FIG. 2 illustrates the various operations involved in a complete operating cycle.

From FIG. 2 it will be seen that valves V11 and V12 are normally closed, and valves V13 and V14 are normally open. Therefore normal flow occurs through flow-tee T11, check valve 16, flow-tee T12, detector D11, flow-tee T13, valve V13, and line L13 to the suction side of the pump 11. Pump 11 discharges through line L14, valve V14, the flow-tee T14, and the sphere detector D12 to the downstream side 10b of the main line.

Figure 3:
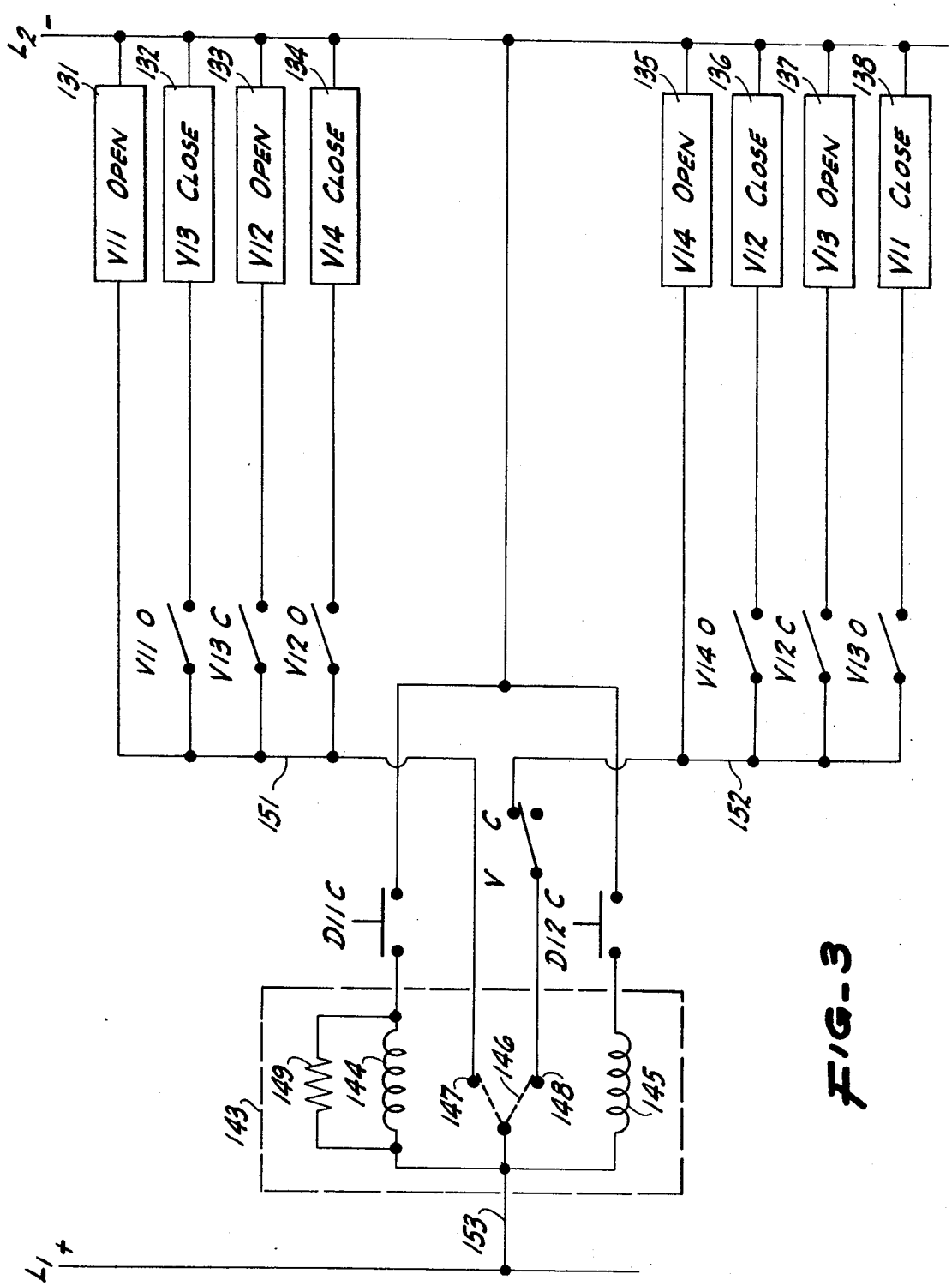
FIG. 3 is a schematic circuit diagram illustrating how various functioning contactors, relays and other parts are connected in a common system with sequential control.

In FIG. 3 the rectangular blocks represent the closing and opening solenoids for the various main line valves, and correspond with the solenoid valves 36 and 37 of FIG. 4. Thus 131 is the open solenoid for valve V11, 132 is the close solenoid for valve V13, 133 is the open solenoid for valve V12, 134 is the close solenoid for valve V14, 135 is the open solenoid for valve V14, 136 is the close solenoid for valve V12, 137 is the open solenoid for valve V13, and 138 is the close solenoid for valve V11. It is also assumed that the hydraulic operators for each of the main valves are each provided with limiting switches operated when the gate of the associated valve reaches its limiting position. In FIG. 3 these limiting switches have been designated V11–0 for the open limiting switch of valve V13, V13–C for the closed switch for valve V12, V12–O for the open limiting switch of valve V14, V14–O for the open limiting switch of valve V12, V12–C for the closed limiting switch of valve V13, and V13–O for the open limiting switch of valve V11.

In FIG. 3 there is also a bistable relay 143 having separate windings 144 and 145 for positioning the switch member 146 into contact with either one of two contactors 147 or 148. Winding 144 is shown being shunted by the resistor 149. The circuitry of FIG. 3 is shown energized by direct current supplied by lines L1 and L2 as indicated. One side of each of the limiting switches V11–O, V13–C and V12–O is connected to a common conductor 151, which connects with contactor 147 of the bistable switch 143. Also one side of each of the limiting switches V14–O, V12–C and V13–O connect with line 152, which connects with contactor 148 of the bistable device 143 in series with the limiting switch V11–C which is the closed limiting switch for valve V11. Conductor 151 also connects with line L2 in series with the open solenoid for valve V11 (131). The indicated contacts D11–C and D12–C represent the electrical contacts of the sphere detectors D11 and D12, or contacts which are actuated by relay means in accordance with closing of contacts in the sphere detectors. The contacts D11– C are connected in series between line L1 and one side of the winding 144. The contacts D12–C are similarly connected in series between line L2 and one side of the winding 145. The other sides of the windings 144 and 145 are connected to line L1 through common conductor 153.

Operation of the system and method is as follows. As previously described, the valves V11 – V14 are normally in the positions indicated at the top of FIG. 2. When a sphere approaches the station it first passes through flow-tee T11, check valve 16 and flow-tee T12. As it reaches the detector D11, the contacts D11–C are closed, with the result that winding 144 is energized to cause the contact member 146 to close upon contact 142. Current is now supplied to the open solenoid 131 of valve V11, with the result that valve V11 starts to open as indicated in FIG. 2. One of the results obtained by first opening valve V11 is to prevent any movement of additional spheres through flow-tee T11 until after the first sphere has been passed. In other words, if a succeeding sphere should reach the station before the first sphere has passed, it will be parked within the flow-tee T11 because of the flow occurring through the valve V11. During the time that valve V11 is opening, the sphere proceeds toward the flow-tee T13. When the valve V11 reaches full open position, its limiting switch V11–O is closed, with the result that the closed solenoid for valve V13 (132) is energized. As a result, valve V13 commences to close as indicated in FIG. 2. When valve V13 is completely closed its limiting switch V13–C is closed, with the result that the open solenoid for valve V12 (133) is energized, thus starting the opening of this valve. As likewise indicated in FIG. 2, when valve V12 is completely open, its limiting switch V12–O is closed, thereby energizing the close solenoid for valve V14 (134). Thus valve V14 starts to close as indicated in the FIG. 2 diagram. During the closing of valve V13 referred to above, all of the suction flow to pump 11 is transferred through valve V11. With the opening of valve V12, some of the discharge from pump 11 is transferred through valve V12, but some continues to flow through valve V14. As valve V14 starts to close, additional flow occurs through flow-tee T14 to ensure continued movement of the sphere through the check valve 17, flow-tee T14 and toward the detector D12. This sphere may reach the detector D12 about the time valve V14 is completely closed, or somewhat prior to that time. Closing of the contacts D12–C causes the winding 145 to be energized, with the result that contact member 146 is closed on contact 148. With contacts V11–C closed, current is supplied to the open solenoid for valve V14 (135). This causes valve V14 to commence to open as indicated in FIG. 2, and as pointed out above this opening may commence before the valve V14 has been completely closed. When the valve V14 is completely open, its open limiting switch V14–O is closed, thus energizing the closing solenoid of valve V12 (136). Thus valve V12 starts to close as indicated in FIG. 2. During the opening of valve V14 flow is restored through this valve from the pump 11, and into the flow-tee T14. Also during the closing of valve V12 some flow from the pump 11 through this valve is reduced, with the result that flow is transferred from valve V12 to valve V14. When the valve V12 is completely closed, its closed limiting switch contacts V12–C are closed, with the result that the open solenoid for valve V13 (137) is energized. Valve V13 therefore commences to open as indicated in FIG. 2. The opening of valve V13 serves to restore some of the suction flow to the pump 13 through this valve. When valve V13 is completely open, its open limiting switch contacts V13–O are closed, thereby energizing the closing solenoid for the valve V11 (138). Thus valve V11 starts to close as indicated in FIG. 10. The closing of this valve V11 restores the system to normal. If the succeeding sphere has been parked in the flow-tee T11, it will now be permitted to pass through the check valve 16, flow-tee T12, and through the detector D11, to commence a new cycle.

In the cycle described above, the liquid flow between lines 10a and 10b continues without interruption through the pump 11, with only sufficient flow being passed through the interconnecting bypass to properly propel a sphere through the flow-tees T13 and T14 and check valve 17.

We claim:

1. In apparatus for use at pumping stations of liquid conveying pipelines where the station pump is normally connected to a portion of the line which connects upstream and downstream line portions, four flow-tees serially connected in the line between the upstream and downstream portions, branch lines connecting between the flow-tees and the suction and discharge sides of the station pump, a control valve in each branch line (the flow-tees hereinafter termed first, second, third and fourth tees in the order in which they are disposed commencing with the tee nearest the upstream line portion, the corresponding branch lines termed first, second, third and fourth branch lines, and the corresponding control valves being termed first, second, third and fourth control valves), the first and third branch lines connecting with the suction side of the pump and the second and fourth branch lines connecting with the discharge side of the pump, a check valve in the line between the first and second flow-tees, another check valve in the line between the third and fourth flow-tees, a sphere detector on the upstream side of the third flow-tee, another sphere detector on the downstream side of the fourth flow-tee, and means for cycling operations of the control valves to cause a sphere arriving at the upstream detector to be flow propelled through the flow-tees and check valves to the downstream line portion, said last means including means responsive to actuation of the first named sphere detector, with the first and second control valves closed and the third and fourth control valves open, for opening the first control valve, means for closing the third control valve responsive to complete opening of the first control valve, means for opening the second control valve responsive to complete closing of the third control valve, means for closing the fourth valve responsive to complete opening of the second control valve, means for opening the fourth valve responsive to actuation of the downstream sphere detector, means for closing the second control valve responsive to complete opening of the fourth control valve, means for opening the third control valve responsive to closing of the second control valve, and means for closing the first control valve responsive to opening of the third control valve.

\* \* \* \* \*